(12) United States Patent
Halbritter (10) Patent No.: US 9,573,350 B2
(45) Date of Patent: Feb. 21, 2017

(54) DEVICES AND METHODS FOR APPLYING SURFACE COVERINGS

(71) Applicant: The Boeing Company, Huntington Beach, CA (US)

(72) Inventor: Allen James Halbritter, Charleston, SC (US)

(73) Assignee: The Boeing Company, Chicago, IL (US)

( * ) Notice: Subject to any disclaimer, the term of this patent is extended or adjusted under 35 U.S.C. 154(b) by 111 days.

(21) Appl. No.: 14/593,990

(22) Filed: Jan. 9, 2015

(65) Prior Publication Data

US 2016/0200083 A1    Jul. 14, 2016

(51) Int. Cl.

| | | |
|---|---|---|
| *B29C 65/48* | (2006.01) | |
| *B32B 37/10* | (2006.01) | |
| *B32B 37/26* | (2006.01) | |
| *B32B 38/10* | (2006.01) | |
| *B32B 38/18* | (2006.01) | |
| *B32B 43/00* | (2006.01) | |
| *B30B 5/02* | (2006.01) | |
| *B30B 15/00* | (2006.01) | |
| *B32B 37/00* | (2006.01) | |
| *B29C 70/00* | (2006.01) | |
| *B29C 63/00* | (2006.01) | |
| *B32B 37/12* | (2006.01) | |

(52) U.S. Cl.
CPC ............ *B32B 37/003* (2013.01); *B29C 63/00* (2013.01); *B29C 70/00* (2013.01); *B32B 37/10* (2013.01); *B32B 37/12* (2013.01); *B32B 2038/1891* (2013.01); *B32B 2605/18* (2013.01)

(58) Field of Classification Search
USPC ....... 156/247, 249, 289, 391, 537, 538, 555, 156/580, 583.3
See application file for complete search history.

(56) References Cited

U.S. PATENT DOCUMENTS

| | | | | |
|---|---|---|---|---|
| 6,001,198 A | * | 12/1999 | Habisreitinger | .... B29C 63/0056 156/212 |
| 7,509,774 B1 | * | 3/2009 | Johnson | .................. B64G 1/12 244/129.3 |

(Continued)

FOREIGN PATENT DOCUMENTS

| | | | | | |
|---|---|---|---|---|---|
| GB | | 2273960 A | * | 7/1994 | ....... B29C 66/81455 |

*Primary Examiner* — Sing P Chan
(74) *Attorney, Agent, or Firm* — Dascenzo Intellectual Property Law, P.C.

(57) ABSTRACT

Applicator devices for applying a surface covering to a part and methods for applying a surface covering to a part are disclosed. Disclosed applicator devices may include an inflatable bladder and a support structure configured to position the inflatable bladder with respect to the part and/or a support surface on which the part is positioned. The inflatable bladder may be used to apply the surface covering to the part, and may be configured to apply a uniform pressure to the surface covering and part, regardless of surface topography. The inflatable bladder may include a cover material at least partially covering the external bladder surface, which may be configured to reduce friction between the inflatable bladder and the surface covering. Such applicator devices may be particularly useful for, for example, applying a decorative laminate to a honeycomb core panel.

20 Claims, 8 Drawing Sheets

(56) References Cited

U.S. PATENT DOCUMENTS

2001/0035258 A1* 11/2001 Justin ................... B29C 63/02
                                                              156/229
2009/0038736 A1* 2/2009 Lorence ................ B32B 27/32
                                                              156/86

* cited by examiner

DEVICES AND METHODS FOR APPLYING SURFACE COVERINGS

FIELD

The present disclosure relates to devices and methods for applying surface coverings.

BACKGROUND

Thin, flexible surface coverings are applied to surfaces in a wide variety of industries and applications. Such surface coverings may include, for example, wallpaper, decorative surface coverings, films, laminates, decorative laminates, and/or any other surface covering. Surface coverings may include an adhesive layer on one side, covered with a removable liner (which may also be referred to as a backing, removable backing, or backing layer) until the time of application. Surface coverings may be applied to any part, surface, or structure, such as tables, counters, walls, ceilings, floors, doors, tables, counters, and etc. Surface coverings such as decorative laminates, are often applied to metallic or composite panels, such as may be used in automotive, aerospace, or any other industrial application.

Such surface coverings are currently applied by hand, by removing the liner to expose the adhesive and applying the surface covering to the part, sweeping one's hand across the non-adhesive side of the surface covering while applying it to the part. Such application methods suffer from imperfections due to non-uniformity of pressure during the sweeping action. Thus, formation of entrapped air pockets or air bubbles between the surface covering and the underlying part is a common problem. In many applications, such trapped air may be aesthetically displeasing and/or detrimental to the performance of the laminate. In the specific example of aircraft parts covered with decorative laminates, the air bubbles may worsen with pressure changes in the aircraft cabin during flight. Repairs to an imperfectly laid surface covering are difficult and time-consuming. There thus remains a need for improved application of decorative laminates and other surface coverings to underlying parts.

SUMMARY

Presently disclosed applicator devices for applying a surface covering to a part or assembly of parts may enable uniform application of said surface covering using an inflatable bladder, which may improve performance of the resulting part and decrease required re-work time as compared to conventional techniques for applying surface coverings. For example, an applicator device according to the present disclosure may include an inflatable bladder having an external bladder surface and an internal bladder surface, the internal bladder surface defining a cavity at least partially filled with a fluid, and a support structure configured to position the inflatable bladder with respect to the support surface. The applicator device may include a cover material at least partially covering the external bladder surface such that the cover material is configured to contact the surface covering as it is applied to the part. In use, the inflatable bladder may be moved with respect to the part and/or the part may be moved with respect to the inflatable bladder, such that the inflatable bladder is swept along the surface covering, thereby pressing it and applying it to the underlying part on the support surface.

Methods for applying a surface covering to a part are also disclosed. Such methods may include positioning the part on a support surface such that a first surface of the part faces the support surface and a second surface of the part faces away from the support surface, positioning a portion of the surface covering between the second surface of the part and an inflatable bladder, contacting the surface covering with the inflatable bladder, positioning a support structure coupled to the inflatable bladder such that the inflatable bladder is held at a predetermined distance from the support surface, and pressing the surface covering onto the second surface of the part with the inflatable bladder. In other methods, a support surface may not be present, with the surface covering being directly applied to a part or assembly of parts (e.g., an aircraft).

DESCRIPTION

Figure 1:
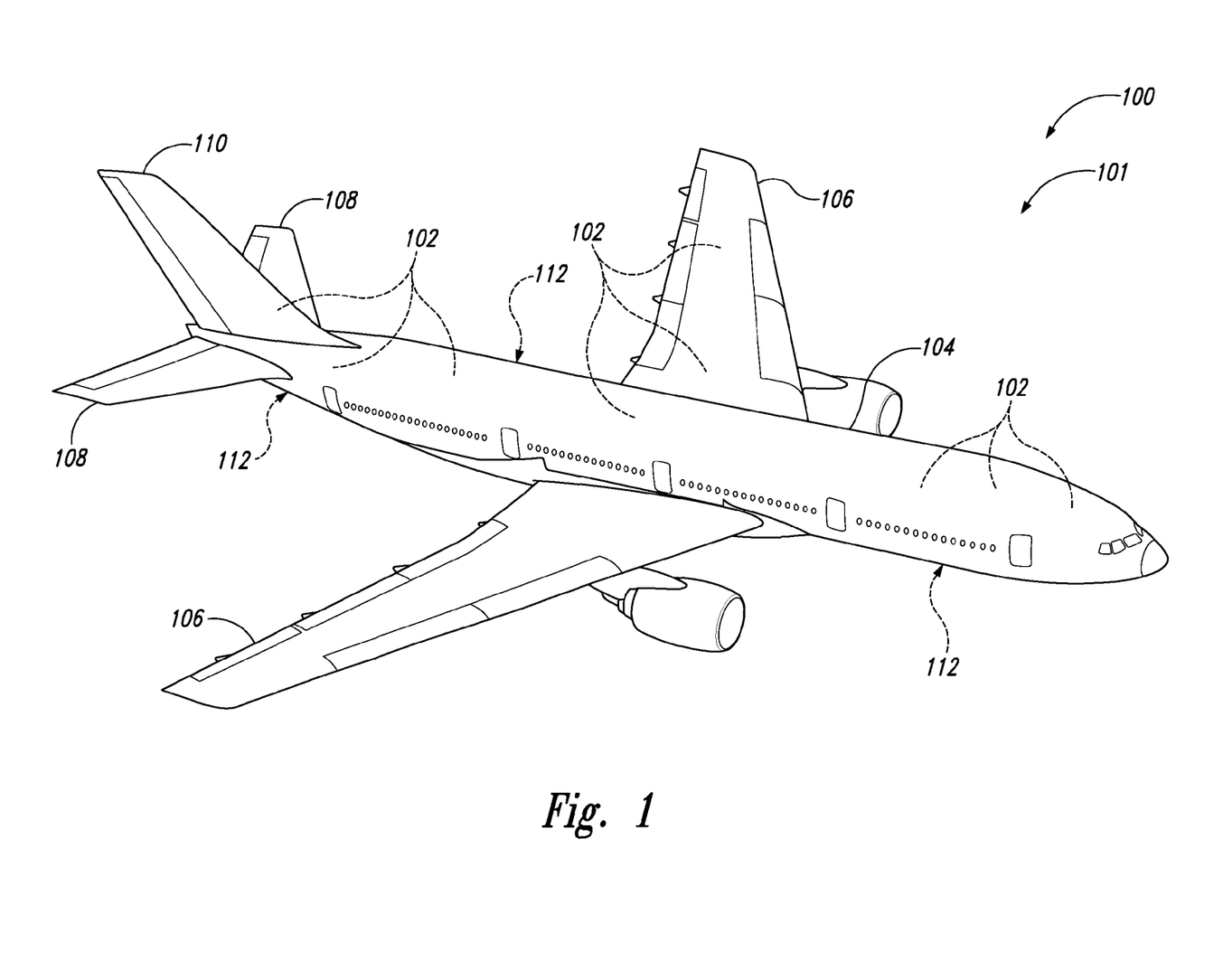
FIG. 1 is a perspective view of an illustrative, non-exclusive example of an aircraft that may include one or more panels or parts having a surface covering applied using devices and/or methods according to the present disclosure.

Devices and methods for applying surface coverings are disclosed herein. Such presently disclosed devices and methods may be used in manufacturing processes, such as in the application of decorative laminates to a honeycomb core panel. In some examples, such devices and/or methods may be used in manufacturing an apparatus, such as apparatus 100, as schematically Illustrated in FIG. 1. For example, apparatus 100 may include one or more panels 102 having a surface covering applied utilizing systems, devices, and/or methods according to the present disclosure.

Apparatus 100 may be provided in the form of an aircraft 101; however, other apparatuses 100 are within the scope of the present disclosure, and the present disclosure is not limited to aircraft and aircraft applications. For example, as illustrative, non-exclusive examples, other apparatuses 100 that may be constructed of one or more panels 102 having a surface covering applied using devices and/or methods according to the present disclosure include (but are not limited to) watercraft, land vehicles, walls, ceilings, floors, counters, or any other structure or device that includes a panel or surface to which a surface covering is applied. Moreover, aircraft 101 may take any suitable form, including commercial aircraft, military aircraft, private aircraft, or any other suitable aircraft. While FIG. 1 illustrates aircraft 101 in the form of a fixed wing aircraft, other types and configurations of aircraft are within the scope of aircraft 101 according to the present disclosure, including (but not limited to) helicopters.

Aircraft 101 may include a fuselage 104, which also may be referred to herein as a barrel 104, and which generally corresponds to the main body of aircraft 101 for holding passengers, crew, cargo, and/or equipment, for example, depending on the particular configuration and/or function of an aircraft 101. Typically, although not required, the fuselage 104 of an aircraft 101 is elongate and somewhat cylindrical or tubular. In some embodiments, the fuselage 104 may be constructed of multiple sections that are longitudinally spaced along the fuselage 104 and operatively coupled together to define the fuselage 104.

Aircraft 101 also may include wings 106, horizontal stabilizers 108, and a vertical stabilizer 110, each of which may be constructed as a unitary structure or in subsections that are subsequently assembled together. One or more of fuselage 104, a wing 106, a horizontal stabilizer 108, a vertical stabilizer 110, or a structural subsection thereof may be constructed of and/or may include a panel 102 having a surface covering applied according to the present disclosure. For example, fuselage 104 may include one or more galley portions 112 within fuselage 104, such galley portions 112 being configured to store, cook, prepare, heat, and/or chill food and beverages for use on board aircraft 101. In some aircraft, galley portions 112 include a plurality of panels 102 having a surface covering applied thereto. Such panels 102 may be referred to as galley panels 102. Additionally or alternatively, other areas of fuselage 104 may contain one or more panels 102, such as for closets, doors, walls, etc.

Figure 2:
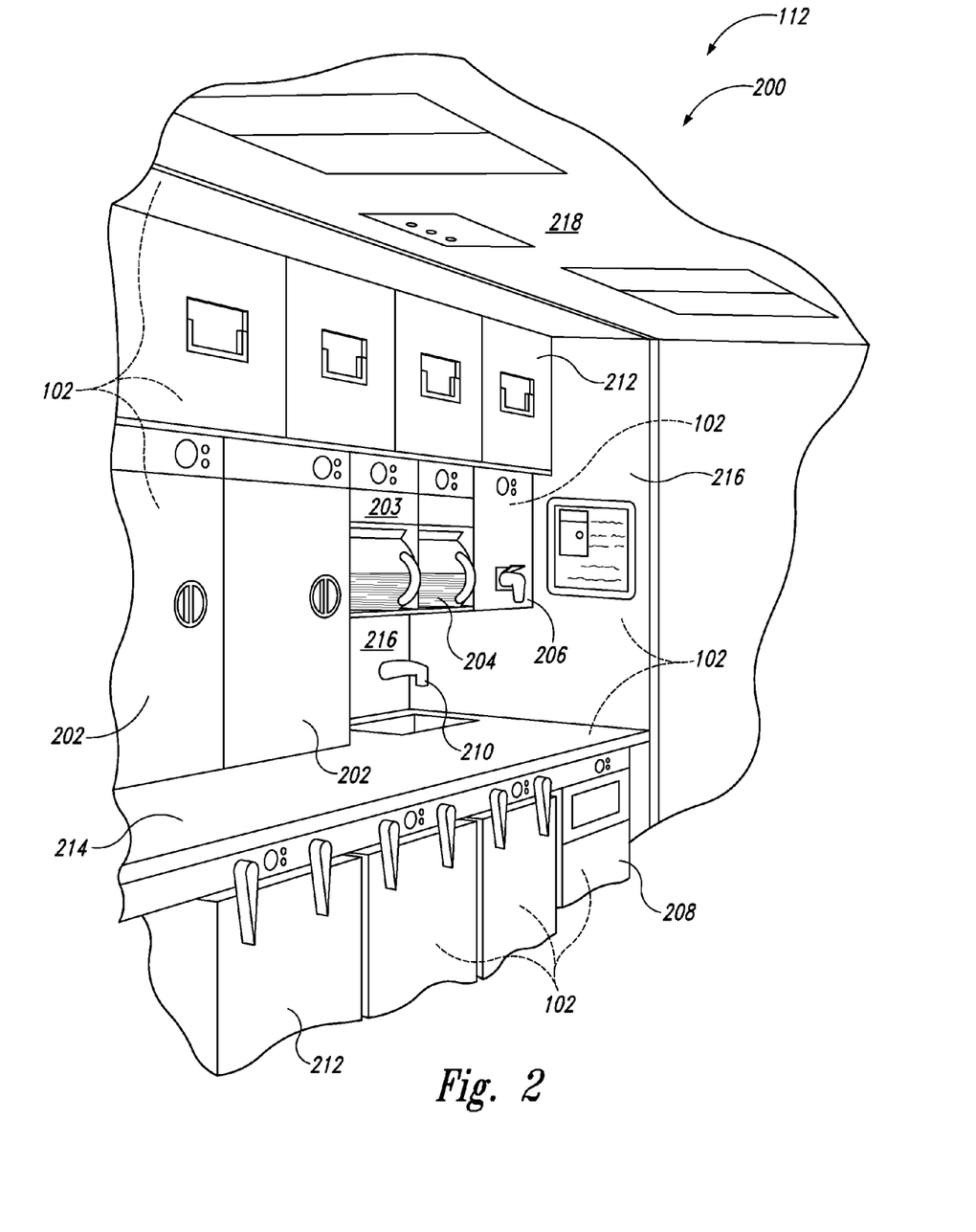
FIG. 2 is a perspective view of an illustrative, non-exclusive example of an aircraft galley that may include one or more panels or parts having a surface covering applied using devices and/or methods according to the present disclosure.

FIG. 2 is a perspective view of an aircraft galley 200, which may be included within an aircraft (e.g., galley portion 112 of aircraft 101 of FIG. 1) or other vehicle. Aircraft galley 200 is shown as an illustrative example, but it is not meant to be limiting in any way. Many different styles and types of aircraft galleys are known and may include more or fewer features than described generally with reference to FIG. 2. For example, exemplary aircraft galley 200 may include one or more various appliances or devices, such as ovens 202, coffee makers 204, a water boiler 206, a trash compactor 208, a sink faucet 210, and/or one or more storage units 212. Any surface in aircraft galley 200 may include a panel (e.g., panel 102) having a surface covering applied using devices and/or methods according to the present disclosure. For example, aircraft galley 200 may generally include a counter area 214, one or more walls 216, and/or a ceiling 218 defining the aircraft galley, any of which may include or be constructed from a panel 102 having a surface covering, such as a honeycomb core panel having a decorative laminate applied thereon. Similarly, one or more of any other device or portion of aircraft galley 200 may include a panel 102 having a surface covering, such as ovens 202, spaces 203 for receiving coffee makers 204, water boiler 206, trash compactor 208, and/or storage units 212. Use of such panels with surface coverings may provide an aesthetically desirable appearance to such aircraft galleys 200. Of course, utility of such panels with surface coverings is not limited to such.

Figure 3:
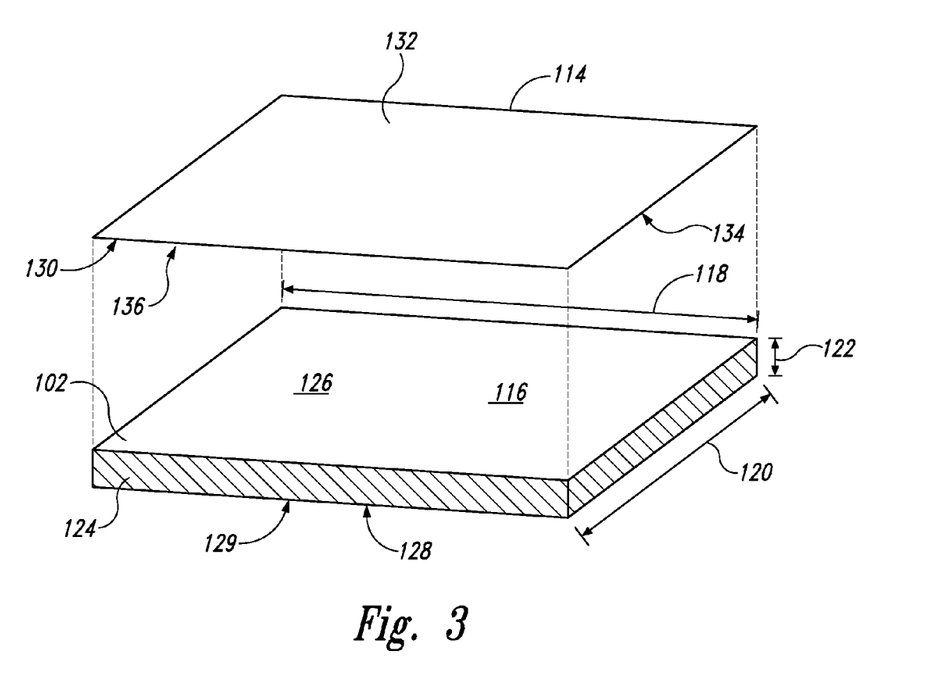
FIG. 3 is an exploded, perspective schematic representation of a panel and a surface covering.
Figure 4:
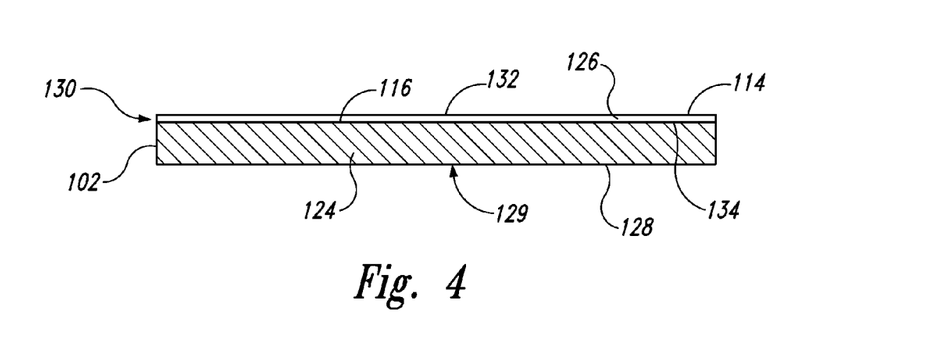
FIG. 4 is a side view of a schematic representation of a panel having a surface covering applied thereon.

FIGS. 3 and 4 show schematic representations of a panel 102 (which may also be referred to as a part 102) having a surface covering 114 applied thereon. Panel 102 may be any size or shape part or panel having a receiving surface 116 that may receive surface covering 114. Opposite receiving surface 116, panel 102 may include an opposite surface 129. Panel 102 may, in some examples, be an elongate panel having a panel length 118 and a panel width 120 that are significantly greater than a panel thickness 122. Other configurations are also possible. For example, panel 102 may be a part 102 (e.g., a cuboid or other shaped part) having a panel thickness 122 similar to or equal to panel length 118 and/or panel width 120.

In some examples, panel 102 may be a composite or metallic panel including a central core 124 sandwiched between a first skin 126 and an opposing second skin 128. First skin 126 may serve as or define receiving surface 116 on which surface covering 114 may be applied (e.g., adhered) and second skin 128 may serve as or define opposite surface 129 which may face a support surface (such as a table, counter, or other surface) on which panel 102 is placed. Central core 124 may be, for example, a metallic or composite honeycomb core 124. In specific examples, panel 102 may be a galley panel 102, such as may be used to form a portion of a galley section of an aircraft. In other examples, panel 102 may be formed of a single or solid material throughout, such that receiving surface 116 is formed integrally with central core 124. Receiving surface 116 is shown as a flat, planar surface; however, receiving surface 116 may be three dimensional. For example, receiving surface 116 may be textured, curved, convex, concave, irregular, and/or any other contour.

Surface covering 114 may be any type of surface covering, but generally may be a thin, flexible layer of material configured to be applied to panel 102 or other part. Surface covering 114 may include an outer surface 132 which may be configured to be visible once surface covering 114 is applied to panel 102. In some examples, outer surface 132 may be a decorative outer surface 132. Opposite the outer surface 132, surface covering 114 may also include a lower surface 134 configured to face panel 102. Lower surface 134 may include an adhesive surface 130 configured to adhere surface covering 114 to panel 102. Additionally or alternatively, panel 102 may include an adhesive coating. Surface covering 114 may include a removable backing layer or liner 136 that may be configured to cover adhesive surface 130 such that surface covering 114 is not prematurely adhered to an unintended surface. Backing layer 136 may be removed in order to expose adhesive surface 130 prior to application of surface covering 114 to panel 102.

Surface covering 114 may include any suitable material desired to be applied to a surface, such as to receiving surface 116 of panel 102. For example, surface covering 114 may include one or more of polymer, paper, fabric, composite, metal, and/or any other material desired to be applied to a surface or part. Surface covering 114 may be a decorative laminate, wall paper, a film, a foil, a thin sheet, and/or any other type of layer. Surface covering 114 may be purely aesthetic in nature, may impart some utility (e.g., may provide surface protection, may increase rigidity, may affect surface smoothness, etc.) to the panel or part to which it is applied, or may have some utility and aesthetic use.

Turning now to FIGS. 5-8, illustrative non-exclusive examples of systems including applicator devices for applying a surface covering are schematically presented. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 5:
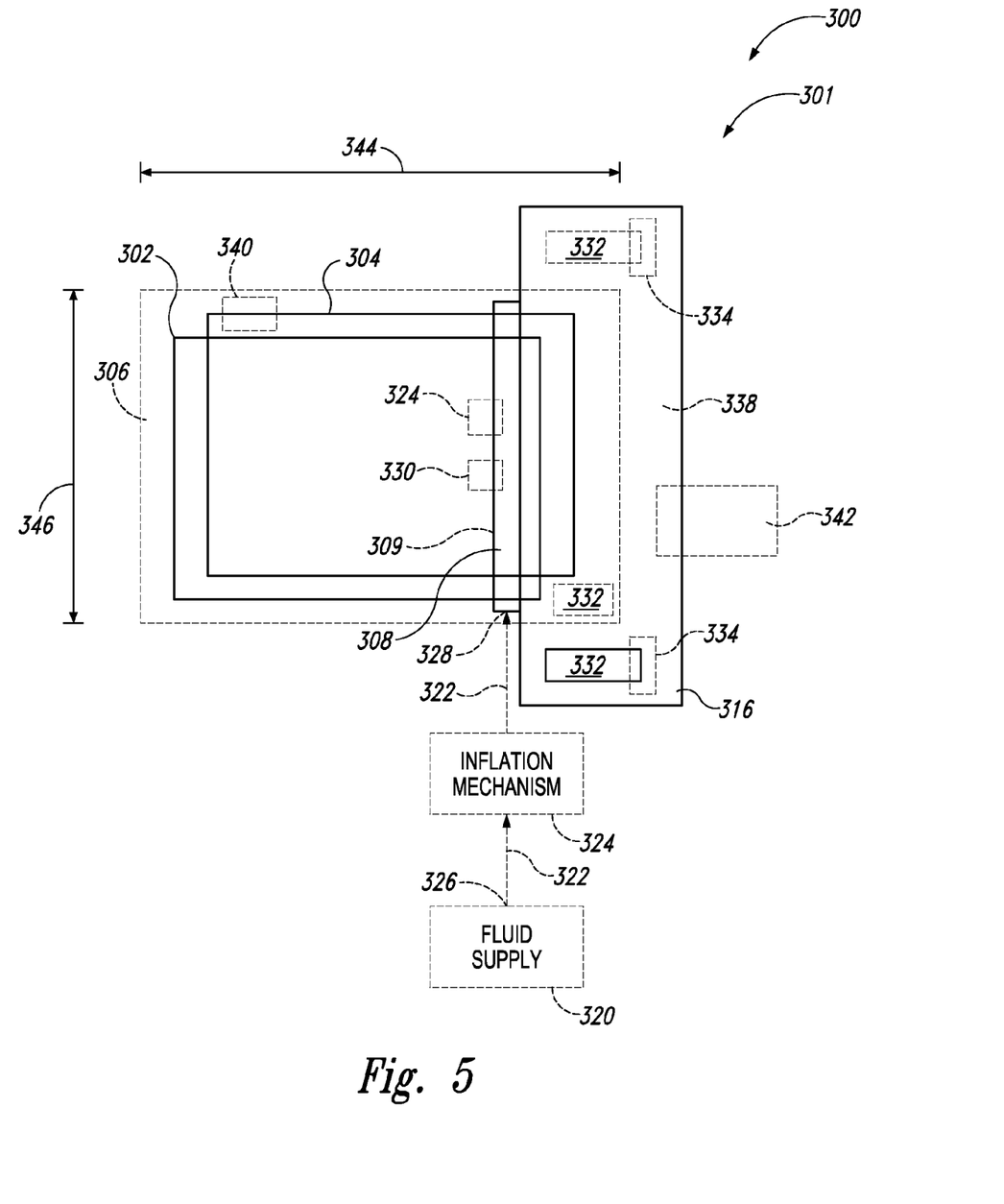
FIG. 5 is a schematic representation of illustrative, non-exclusive examples of systems and applicator devices for applying a surface covering to a part according to the present disclosure.
Figure 6:
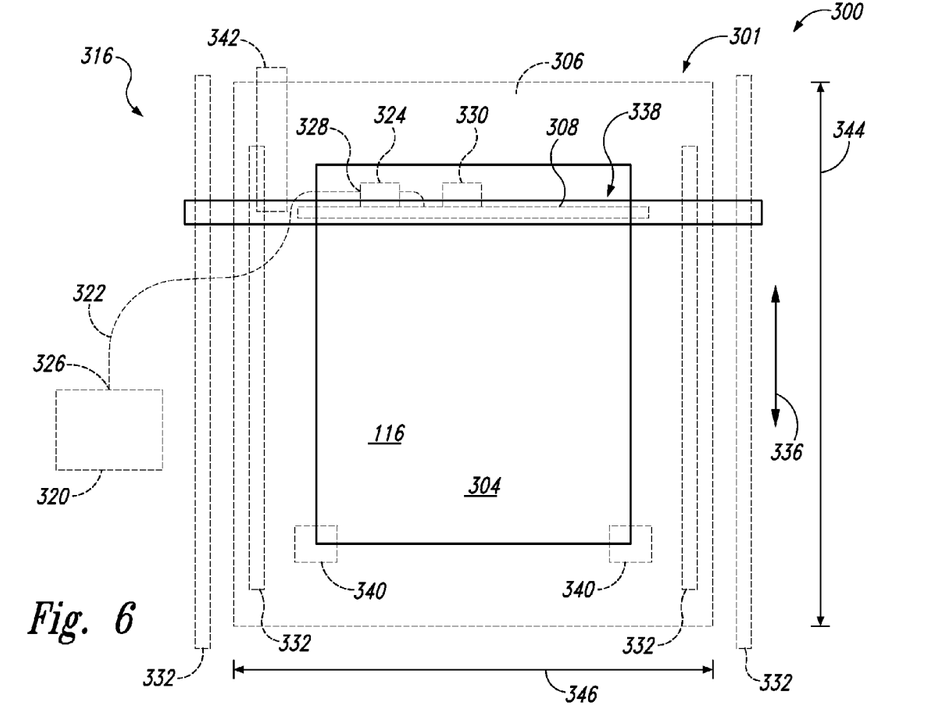
FIG. 6 is a schematic representation of illustrative, non-exclusive examples of systems and applicator devices for applying a surface covering to a part according to the present disclosure.
Figure 7:
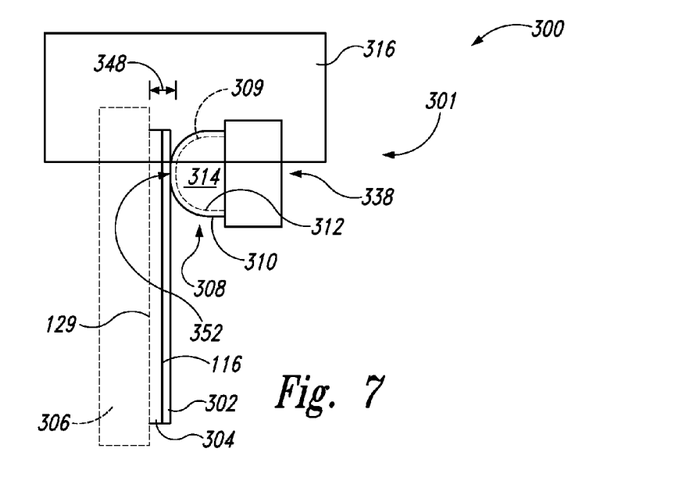
FIG. 7 is a schematic representation of illustrative, non-exclusive examples of systems and applicator devices for applying a surface covering to a part according to the present disclosure.
Figure 8:
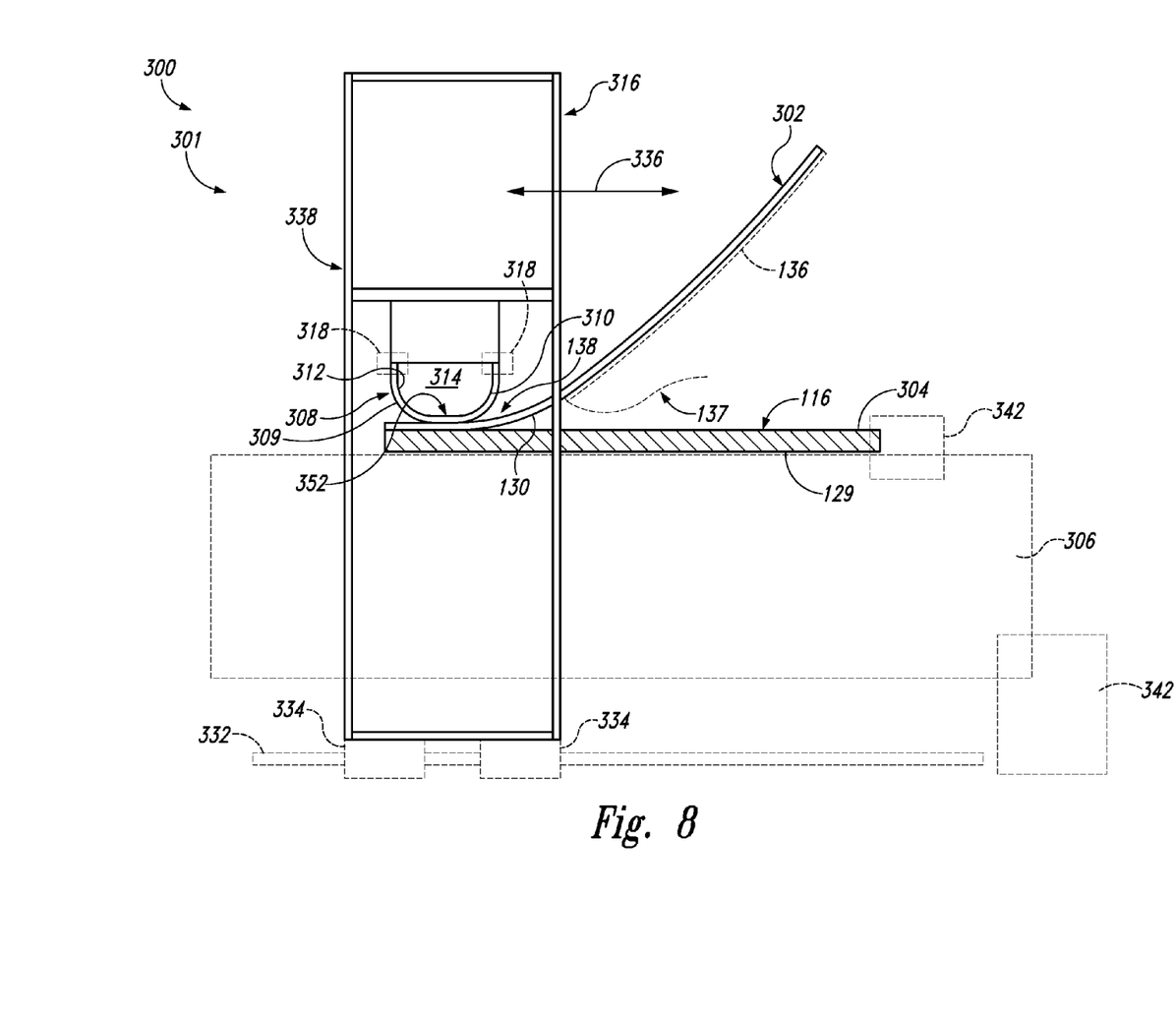
FIG. 8 is a schematic representation of illustrative, non-exclusive examples of systems and applicator devices for applying a surface covering to a part according to the present disclosure.

FIGS. 5-8 illustrate systems 300 and applicator devices 301 according to the present disclosure. Applicator device 301 may be configured to apply a surface covering 302 (which may be, for example, surface covering 114 from FIGS. 3-4) to a part 304 (which may be, for example, panel 102 of FIGS. 3-4, or other part or assembly of parts, such as a wing, fuselage, or aircraft). In some examples, part 304 may be positioned on a support surface 306 during application of surface covering 302. However, in other examples, surface covering 302 may be applied directly to part 304 without a support structure (e.g., in examples where surface covering may be applied directly to an assembly of parts, such as an aircraft). In examples including a support structure, support surface 306 may be any surface configured to hold or support part 304, such as a table, floor, counter, shelf, or the like. Support surface 306 may also include an additional structure or intermediary between said table, floor, counter, etc. and part 102. Part 304 may be positioned between support surface 306 and at least a portion of surface covering 302. As best seen in FIGS. 7-8, part 304 may be placed such that a first surface (e.g., opposite surface 129, which may be a lower surface 129) faces support surface 306, and a second surface (e.g., upper, or receiving, surface 116) faces away from support surface 306. In some examples, part 304 may be secured or locked in place on support surface 306, such as with one or more stabilizing mechanisms 340 (FIGS. 5-6), which may be configured to secure part 304 with respect to support surface 306. Surface covering 302 may be the same size as, smaller than, or larger than the receiving surface 116 of part 304. For example, surface covering 302 may be sized and shaped to correspond to part 304 and completely cover a receiving surface 116 thereon. In other examples, surface covering 302 may be sized to cover just a portion of receiving surface 116 of part 304. In still other examples, surface covering 302 may be larger than receiving surface 116 of part 304 and extend past one or more edges of part 304.

Applicator device 301 may include an inflatable bladder 308 that is configured to press surface covering 302 onto part 304. Applicator device 301 may also include a support structure 316 configured to support and position inflatable bladder 308 with respect to support surface 306 and/or with respect to part 304. Inflatable bladder 308 may be at least partially filled with a fluid (e.g., air or some other gas, or a liquid, such as an oil) and configured to impart a desired pressure onto surface covering 302 and part 304. Support structure 316 may be any structure that is configured to move inflatable bladder 308 and/or part 304 such that inflatable bladder is swept across part 304 in order to apply surface covering 302.

In some examples, support structure 316 may be configured to suspend inflatable bladder 308 above support surface 306. Support structure 316 may include a frame that holds inflatable bladder 308. Some or all of support structure 316 may be positioned on support surface 306 (or on part 304, such as in the case that part 304 is an assembly of parts, such as a wing of an aircraft) in some examples. In other examples, support structure 316 may be positioned surrounding support surface 306 and/or part 304, such as in the example of a frame structure configured to have supports on either side of support surface 306 and/or part 304. Inflatable bladder 308 may be elongated in shape, such as to extend across a length or width of part 304 in order to apply surface covering 302 uniformly. In some examples, inflatable bladder 308 may be substantially cylindrical or hemispherical in shape, but other shapes are also within the scope of the present disclosure.

Support structure 316 may be configured to move inflatable bladder 308 with respect to support surface 306 in some examples. Additionally or alternatively, support structure 316 may be configured to hold inflatable bladder 308 substantially stationary while support structure 306 and/or part 304 and surface covering 302 are moved with respect to inflatable bladder 308. As inflatable bladder 308 and/or part 304 is moved, support structure 316 may hold inflatable bladder 308 relative to surface covering 302 and part 304 such that inflatable bladder 308 is caused to press surface covering 302 onto part 304.

As seen in FIGS. 6 and 8, support structure 316 may include one or more rail members 332, which may be positioned on support surface 306 (or part 304) and/or separate from support surface 306 or part 304 (e.g., on a floor on which support surface 306 or part 304 is positioned). Rail members 332 may extend along part 304 and/or along support surface 306. Rail members 332 may be configured to hold support structure 316 stationary, while support surface 306 and/or part 304 are moved with respect to inflatable bladder 308 held by support structure 316. In other examples, rail members 332 may be configured to direct movement of support structure 316. For example, rail members 332 may be configured to allow support structure 316 to be selectively moved back and forth in a line (e.g., along the length of rail members 332), while restricting support structure 316 from moving laterally with respect to support surface 306 and/or part 304. In some examples, rail members 332 may be configured to ensure that support structure 316 may be moved only in a straight line, thereby preventing it from moving out of alignment with support surface 306 and/or part 304.

Rail members 332 may, for example, include a groove or slot in which support structure 316 may be secured within and slide back and forth along. In some examples, rail members 332 may be encircled or surrounded by a portion of support structure 316. For example, support structure 316 may include one or more rail engagement members 334 that are configured to engage with rail members 332. For example, rail engagement members 334 may be linear bearings 334 that slide along rail members 332, such as selectively in the directions indicated by arrow 336 (FIGS. 6 and 8). Other arrangements are also within the scope of the disclosure. Rail engagement members 334 may be coupled to a bladder-supporting portion 338 of support structure 316 such that bladder-supporting portion 338 is configured to travel along rail members 332 via rail engagement members 334.

In some examples, rail engagement members 334 may be locked in place with respect to rail members 332, thereby substantially preventing movement of support structure 316. Thus, in some examples, support structure 316 may be configured to hold inflatable bladder 308 substantially stationary with respect to support surface 306. Additionally or alternatively, support structure 316 may be configured to selectively move inflatable bladder 308 with respect to support surface 306 and/or part 304. In some examples, support structure 316 may be configured to move support surface 306 and/or part 304 with respect to inflatable bladder 308 during application of surface covering 302 to part 304 (which may or may not be resting on support surface 306). Rail members 332 and rail engagement members 334 are shown and described for example purposes only, and support structure 316 is not limited to such. Support structure 316 may be any structure or mechanism that may be configured to move inflatable bladder 308 and/or part 304 so that inflatable bladder 308 may press a surface covering onto part 304.

Support surface 306 may dimensionally be defined by a length 344 and a width 346 (FIGS. 5-6); however, the terms are interchangeable for purposes discussed herein. As best seen in FIGS. 5 and 6, inflatable bladder 308 may be oriented substantially perpendicular to length 344 such that inflatable bladder 308 extends across a portion of width 346. Support structure 316 and inflatable bladder 308 may be configured to travel along length 344 of support surface 306 (e.g., in the directions indicated by arrow 336). In some examples, inflatable bladder 308 may be sized to extend across a significant portion of width 346 of support surface 306. For example, inflatable bladder 308 may extend across at least 50%, at least 60%, at least 70%, at least 80%, at least 90%, and/or at least 100% of width 346 of support surface 306.

In some systems 300, a robotic device 342 (FIGS. 5-6) may be configured to move applicator device 301 (and thereby inflatable bladder 308) with respect to support surface 306 (e.g., robotic device 342 may be configured to cause support structure 316 to move along rail members 332). In some systems, robotic device 342 (FIG. 8) may be configured to move support surface 306 and/or part 304 with respect to applicator device 301. Some systems 300 do not include robotic device 342, and in such systems, support structure 316, part 304, and/or support surface 306 may be moved manually in order to apply surface covering 302 to part 304.

As seen in FIGS. 7-8, inflatable bladder 308 may have an external bladder surface 310 and an internal bladder surface 312, where internal bladder surface 312 defines a cavity 314 at least partially filled with a fluid, such as a gas (e.g., air) or liquid (e.g., oil). Systems 300 may include a fluid supply 320 (FIGS. 5-6) for supplying cavity 314 with fluid. For example, fluid supply 320 may be a container or tank of gas or liquid coupled to inflatable bladder 308 by tubing 322 such that tubing 322 is configured to deliver fluid from fluid supply 320 to cavity 314 of inflatable bladder 308. Fluid supply 320 may be coupled to inflatable bladder 308 indirectly, such as via a pump or compressor in some examples. In some systems, an inflation mechanism 324 may be configured to control flow of fluid from fluid supply 320 to inflatable bladder 308 (e.g., inflation mechanism 324 may be configured to selectively allow or prevent fluid from a fluid supply to enter inflatable bladder 308). For example, inflation mechanism 324 may be configured to prevent filling of inflatable bladder 308 until a valve or switch is flipped, thereby allowing fluid (e.g., air) to enter cavity 314 of inflatable bladder 308. In some examples, inflation mechanism 324 may be coupled to tubing 322, between a first tubing end 326 coupled to fluid supply 320 and a second tubing end 328 coupled to inflatable bladder 308. Systems 300 may also include a regulator or pressure gauge 330, such as an air regulator (FIGS. 5-6) that displays the current fluid pressure within cavity 314 of inflatable bladder 308.

Also, as best seen in FIGS. 7-8, inflatable bladder 308 may include a cover material 309 at least partially covering external bladder surface 310. Cover material 309 may be configured to contact surface covering 302 as it is applied to part 304. For example, cover material 309 may be configured to travel smoothly along the surface of part 304. In examples where inflatable bladder 308 is made of rubber or another material likely to stick or catch as it is moved along the surface of part 304, cover material 309 may reduce friction between inflatable bladder 308 and part 304. Cover material 309 may be any material that improves movement of inflatable bladder 308 across surface covering 302. For example, cover material 309 may include a cloth, such as a felt or fiberglass covering that is positioned around at least a portion of inflatable bladder 308; however, any other suitable material may be used.

Cover material 309 may be flexible enough that it is configured to conform to inflatable bladder 308 and uniformly transmit pressure to surface covering 302. In some examples, cover material 309 may be coupled to inflatable bladder 308. Additionally or alternatively, cover material 309 may be coupled to support structure 316. Fasteners 318 (FIG. 8) may be used to couple cover material 309 to inflatable bladder 308 and/or support structure 318. For example, fasteners 318 may include one or more buttons, snaps, screws, hook and loop fasteners, stitches, adhesive, and/or any other suitable fastener capable of securing cover material 309 around at least a portion of inflatable bladder 308 and/or to support structure 316. In some examples, cover material 309 may be bonded directly to inflatable bladder 308.

As best seen in FIGS. 7-8, support structure 316 may be configured to position inflatable bladder 308 at a predetermined distance from support surface 306 and/or part 304, such as at a predetermined height 348 above support surface 306 (or part 304). As shown in FIG. 7, predetermined height 348 may be measured between support surface 306 (or part 304) and inflatable bladder 308; however, other configurations are also possible. For example, a predetermined height may be determined between the upper, or receiving, surface 116 of part 304 and bladder-supporting portion 338 of support structure 316. Regardless of the points between which predetermined height 348 is measured, support structure 316 may be configured to position inflatable bladder 308 with respect to support surface 306 and/or part 304 such that inflatable bladder 308 contacts surface covering 302, thereby forming a footprint, or an area of contact 352, as defined by the surface of inflatable bladder 308, whether or not a cover material 309 is present on inflatable bladder 308. For example, in examples where part 304 and surface covering 302 are positioned between support surface 306 and inflatable bladder 308, support structure 316 may be configured to position inflatable bladder 308 at a predetermined height above support surface 306, wherein the predetermined height allows for placement of part 304 between support surface 306 and inflatable bladder 308 such that area of contact 352 forms when inflatable bladder 308 is brought into contact with part 304. In addition to the distance between inflatable bladder 308 and part 304 or support surface 306, fluid pressure within cavity 314 of inflatable bladder 308 and/or the diameter of inflatable bladder 308 may also impact the size of area of contact 352 (e.g., the extent to which inflatable bladder 308 is compressed when in contact with surface covering 302 (and indirectly in contact with part 304 and support surface 306)). In some examples, a lower fluid pressure within cavity 314 may increase the size of area of contact 352 and a higher fluid pressure within cavity 314 may decrease the size of area of contact 352. Fluid pressure within cavity 314 and the distance between inflatable bladder 308 and support surface 306 (e.g., predetermined height 348) may be changed and optimized depending on the size/thickness of the part or panel, the thickness of the surface covering 302, and/or the desired amount of force to be applied to surface covering 302 and part 304 as the surface covering is being applied.

In some examples, inflatable bladder 308 and/or support structure 316 may be heated. For example, inflatable bladder 308 and support structure 316 may be operated within a heated environment. Additionally or alternatively, inflatable bladder 308 may be heated, such as by flowing a heated fluid (e.g., heated air or heated oil) through inflatable bladder 308. In some examples, a heating element or heater may be configured to heat inflatable bladder 308. For example, a flexible membrane heater may be coupled to inflatable bladder 308, such as between the bladder and cover material 309.

As best seen in FIG. 8, in systems 300 where surface covering 302 includes a removable liner or backing layer 136 covering an adhesive surface 130, in order to begin application of surface covering 302 to part 304, a portion 138 of surface covering 302 may be positioned between part 304 and inflatable bladder 308. A portion 137 of backing layer 136 may be peeled away from adhesive surface 130, thereby exposing a portion of the adhesive in the area of the portion 138 of the surface covering 302 corresponding to initiation of the application of surface covering 302. As surface covering 302 is applied to part 304 (e.g., as support structure 316 and inflatable bladder 308 are moved relative to support surface 306 and part 304, or as part 304 and/or support surface 306 are moved relative to support structure 316 and inflatable bladder 308), backing layer 136 may be further peeled away from surface covering 302, such that the portion 137 of backing layer 136 that is removed from surface covering 302 increases and the exposed portions of adhesive surface 130 on surface covering 302 are pressed onto part 304. In this manner, by the time the entire surface covering 302 has been pressed onto part 304, backing layer 136 may be completely removed from surface covering 302. In other examples, backing layer 136 may be removed before surface covering 302 is positioned between part 304 and inflatable bladder 308.

Figure 9:
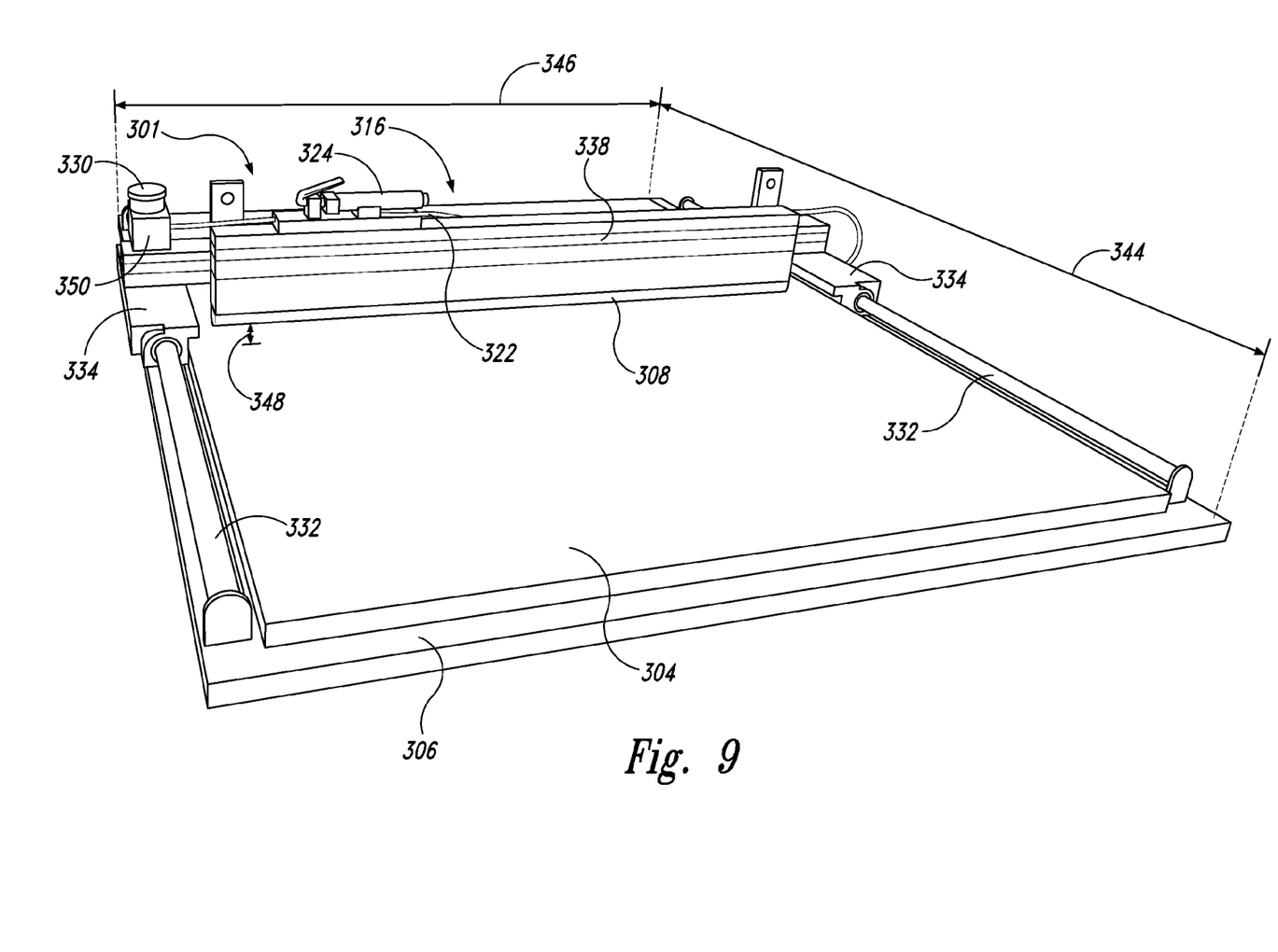
FIG. 9 is a perspective view of an exemplary applicator device for applying a surface covering to a part according to the present disclosure.

FIG. 9 shows an example of an applicator device 301 in position on support surface 306 (e.g., table 306). Where appropriate, the reference numerals from the schematic illustrations of FIGS. 5-8 are used to designate corresponding parts of FIG. 9; however, the example shown in FIG. 9 is non-exclusive and does not limit systems to the illustrated embodiment of FIG. 9. That is, disclosed systems and applicator devices are not limited to the specific embodiment illustrated in FIG. 9 and may incorporate any number of the various aspects, configurations, characteristics, properties, etc. of systems and applicator devices that are illustrated in and discussed with reference to the schematic representations of FIGS. 5-8 as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each figure; however, it is within the scope of the present disclosure that the previously discussed features, variants, etc. may be utilized with any system or applicator device.

In FIG. 9, support surface 306 may support part 304, such as a door panel for use in an aircraft. Support structure 316 may include bladder-supporting portion 338 that is configured to position inflatable bladder 308 at a predetermined height 348 above support surface 306. Inflatable bladder 308 may extend across a portion of the width 346 of support surface 306, while a rail member 332 may extend along a portion of the length 344 of support surface 306 on either side of the surface. Support structure 316 may also include a rail engagement member 334 for each of the rail members 332, such that each rail engagement member 334 is configured to slide along a respective rail member 332, thereby allowing support structure 316 and inflatable bladder 308 to be selectively moved relative to support surface 306 (e.g., moved back and forth along length 344 of support surface 306). In this manner, inflatable bladder 308 may be moved such that it uniformly presses and applies a surface covering to part 304 on support surface 306.

Inflatable bladder 308 may be inflated to a sufficient pressure in order to contact and apply a surface covering (e.g., surface covering 302 of FIGS. 5 and 7-8; not shown in FIG. 9, for clarity) to part 304. Inflatable bladder 308 may be coupled to a fluid supply (e.g., fluid supply 320 of FIGS. 5-6, such as an air supply) via tubing 322. Tubing 322 may be configured to at least partially fill inflatable bladder 308 with a fluid (e.g., air) from a fluid supply, such as via an inlet 350, which may be coupled to the fluid supply. Applicator device 301 may include a pressure gauge 330 to display the current pressure within the cavity of inflatable bladder 308 and an inflation mechanism 324 which may be used to selectively control when inflatable bladder 308 received fluid from the fluid supply. In some examples, inflatable bladder 308 may be inflated to a relatively low pressure such that when pressed onto part 304, inflatable bladder 308 creates a surface area of contact onto part 304 and the surface covering being applied thereto. Furthermore, inflatable bladder 308 may be inflated to a relatively low pressure in order to prevent damage to or crushing of part 304. For example, inflatable bladder 308 may be inflated to a pressure of less than 5 kPa, at least 5 kPa, at least 10 kPa, at least 15 kPa, at least 20 kPa, at least 25 kPa, at least 30 kPa, at least 35 kPa, at least 40 kPa, at least 45 kPa, at least 50 kPa, at least 55 kPa, at least 60 kPa, at least 65 kPa, and/or at least 70 kPa. Once configured at a chosen internal bladder pressure and predetermined height above support surface, applicator device 301 may be used to apply a surface covering to part 304, such as described in connection with the methods illustrated in FIG. 10.

Figure 10:
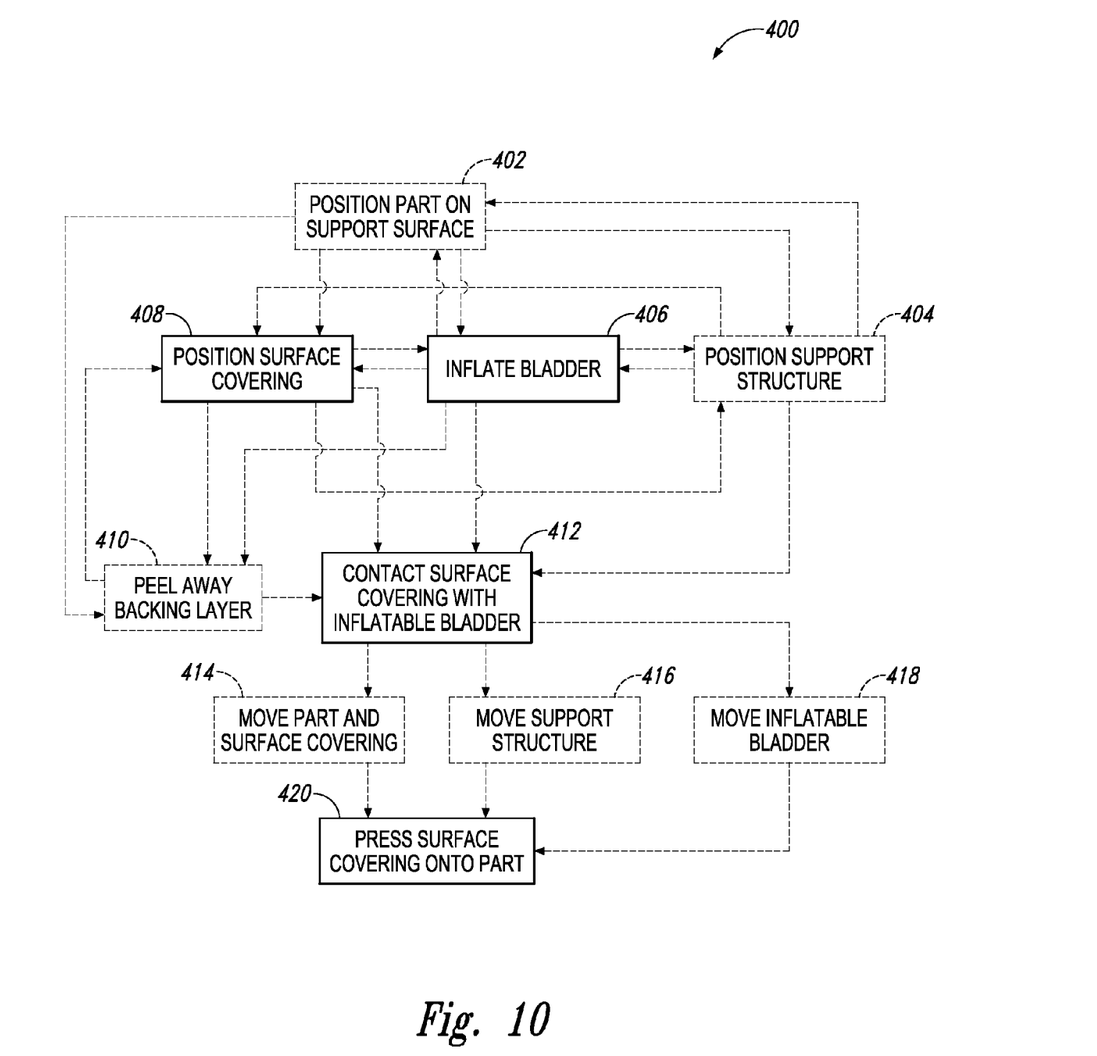
FIG. 10 is a schematic flow diagram of presently disclosed methods of applying a surface covering to a part according to the present disclosure.

FIG. 10 schematically provides a flowchart that represents illustrative, non-exclusive examples of methods according to the present disclosure. In FIG. 10, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 10 are not limiting and other methods and steps are within the scope of the present disclosure, including methods having greater than or fewer than the number of steps illustrated, as understood from the discussions herein.

Methods 400 for applying a surface covering to a part may include positioning a part (e.g., panel 102 or part 304, such as a composite panel or a honeycomb core panel, wing, fuselage, or aircraft) on a support surface (e.g., a support surface 306, such as a table) at 402. Positioning the part at 402 may include positioning the part such that a first surface (e.g., lower surface 129) faces the support surface and a second, opposite, surface (e.g., receiving surface 116) faces away from the support surface. A support structure (e.g., support structure 316) configured to support an inflatable bladder (e.g., inflatable bladder 308) may be positioned relative to the part and/or support surface at 404. Some methods 400 may include inflating the inflatable bladder at 406, such as by coupling the inflatable bladder to a fluid supply (e.g., fluid supply 320) and allowing at least a portion of the inflatable bladder to be filled with fluid, such as air. In some methods 400, the inflatable bladder may be pre-filled. In some methods 400, the inflatable bladder may be filled at 406 or pre-filled to a pressure of less than 5 kPa, at least 5 kPa, at least 10 kPa, at least 15 kPa, at least 20 kPa, at least 25 kPa, at least 30 kPa, at least 35 kPa, at least 40 kPa, at least 45 kPa, at least 50 kPa, at least 55 kPa, at least 60 kPa, at least 65 kPa, and/or at least 70 kPa.

At least a portion of a surface covering (e.g., surface covering 302, such as a decorative laminate) may be positioned, such as being positioned between the part and the inflatable bladder at 408. In some methods 400, the surface covering may be positioned between the part and the inflatable bladder before the inflatable bladder is inflated. In some methods 400, the surface covering may be positioned on the part before the inflatable bladder and support structure are positioned with respect to the part and/or support surface. In some methods 400, the surface covering may include an outer surface (e.g., a decorative surface) that is intended to be the side of the surface covering that is visible after the surface covering is applied to a part. In such methods, the surface covering may be positioned at 408 such that said outer surface faces away from the part and/or the support surface, and faces the inflatable bladder when the inflatable bladder is in position to apply the surface covering to the part.

In methods 400 where the surface covering includes an adhesive surface, or adhesive coating, covered by a backing layer (e.g., adhesive surface 130 covered by backing layer 136, as best seen in FIG. 8), some or all of the backing layer may be removed or peeled away at 410 to expose at least a portion of the adhesive surface. In such methods, positioning a portion of the surface covering at 408 may include positioning the surface covering such that the exposed area of the adhesive surface faces the second surface (e.g., the upper surface, or receiving surface) of the part. Such removal of the backing layer at 410 may be performed at least partially before the surface covering is positioned in some methods. Once at least a portion of the surface covering is placed between the inflatable bladder and the part, the surface covering may be contacted by the inflatable bladder (directly or indirectly, such as if a cover material is present on the inflatable bladder) at 412, in such a manner that the inflatable bladder applies enough pressure to the surface covering to press it onto the part, thereby applying the surface covering to the part in the initial area where the inflatable bladder is in contact with the surface covering.

In order to press the entire surface covering onto the part, the inflatable bladder may be made to contact substantially the entire surface area of the surface covering, thereby uniformly applying it to the part on the support surface. For example, the part and surface covering may be moved with respect to the inflatable bladder at 414, at least a portion of the support structure may be moved with respect to the support surface and/or part at 416, and/or the inflatable bladder may be moved with respect to the part, surface covering, and/or support surface at 418. In some methods, moving the part and surface covering at 414 may include moving the support surface and/or part with respect to the inflatable bladder and support structure. Moving the support structure at 416 may include moving a portion of the support structure, such as the bladder-supporting structure, with respect to rail members that may be positioned on the support surface or apart from the support surface (e.g., on the floor). In other methods, moving the support structure at 416 may include moving the entire support structure with respect to the support surface and/or part, while the part and surface covering are kept relatively stationary. The surface covering may be completely pressed onto the part at 420, such as by causing the inflatable bladder to sweep along the entire surface area of the surface covering, thereby uniformly applying it to the part.

Illustrative, non-exclusive examples of inventive subject matter according to the present disclosure are described in the following enumerated paragraphs:

A1. An applicator device for applying a surface covering to a part, comprising:

an inflatable bladder having an external bladder surface and an internal bladder surface, the internal bladder surface defining a cavity at least partially filled with a fluid;

a support structure that positions the inflatable bladder with respect to the part; and a cover material at least partially covering the external bladder surface, the cover material contacting the surface covering as it is applied to the part.

A1.1. The applicator device of paragraph A1, wherein the part is positioned on a support surface.

A1.2. The applicator device of paragraph A1.1, wherein the support structure positions the inflatable bladder with respect to the support surface A2. The applicator device of any of paragraphs A1-A1.2, wherein the fluid comprises a gas.

A2.1 The applicator device of any of paragraphs A1-A1.2, wherein the fluid comprises an oil.

A2.2 The application device of any of paragraphs A1-A1.2, wherein the fluid comprises a heated oil.

A3. The applicator device of any of paragraphs A1-A2.2, wherein the fluid comprises a liquid.

A4. The applicator device of any of paragraphs A1-A3, wherein the inflatable bladder is an elongated bladder.

A5. The applicator device of any of paragraphs A1-A4, wherein the inflatable bladder is a rubber bladder.

A6. The applicator device of any of paragraphs A1-A5, wherein the inflatable bladder is a cylindrically-shaped bladder.

A6.1 The applicator device of any of paragraphs A1-A6, wherein the inflatable bladder is heated.

A7. The applicator device of any of paragraphs A1-A6.1, wherein the cover material is coupled to the inflatable bladder.

A8. The applicator device of any of paragraphs A1-A7, wherein the cover material is coupled to the support structure.

A9. The applicator device of any of paragraphs A1-A8, wherein the cover material comprises a fabric.

A10. The applicator device of any of paragraphs A1-A9, wherein the cover material comprises one or more of felt and fiberglass.

A11. The applicator device of any of paragraphs A1-A10, wherein the support structure is configured to hold the inflatable bladder substantially stationary with respect to the part.

A11.1. The applicator device of any of paragraphs A1-A11, wherein the support structure is configured to hold the inflatable bladder substantially stationary with respect to a/the support surface on which the part is positioned.

A12. The applicator device of any of paragraphs A1-A10, wherein the support structure is configured to selectively move the inflatable bladder with respect to the part.

A12.1. The applicator device of any of paragraphs A1-A10, wherein the support structure is configured to selectively move the inflatable bladder with respect to a/the support surface on which the part is positioned.

A13. The applicator device of any of paragraphs A1-A12, wherein the support structure is configured to selectively move the part with respect to the inflatable bladder.

A13.1. The applicator device of any of paragraphs A1-A12, wherein the support structure is configured to selectively move a/the support surface with respect to the inflatable bladder, the part being positioned on the support surface.

A14. The applicator device of any of paragraphs A1-A13, further comprising a regulator configured to control a fluid pressure within the cavity of the inflatable bladder.

A15. The applicator device of paragraph A14, wherein the regulator is an air regulator.

A16. The applicator device of any of paragraphs A1-A15, further comprising a pressure gauge configured to display a/the fluid pressure within the cavity of the inflatable bladder.

A17. The applicator device of any of paragraphs A1-A16, further comprising an inflation mechanism configured to selectively allow or prevent air from a supply of air to enter the inflatable bladder.

A18. The applicator device of any of paragraphs A1-A17, further comprising a fluid supply and tubing, wherein the tubing is coupled to the inflatable bladder at a first tubing end and coupled to the fluid supply at a second tubing end, and wherein the tubing is configured to deliver fluid from the fluid supply to the cavity of the inflatable bladder.

A19. The applicator device of paragraph A18, wherein the fluid supply is an air supply.

A20. The applicator device of paragraphs A17 and A18, wherein the inflation mechanism is coupled to the tubing at a point between the first tubing end and the second tubing end.

A21. The applicator device of any of paragraphs A1-A20, wherein the support structure comprises one or more linear bearings.

A22. The applicator device of any of paragraphs A1-A21, wherein the support structure comprises a bladder-supporting portion that is configured to travel along one or more rails.

A23. The applicator device of paragraph A22, further comprising the one or more rails, wherein the one or more rails are positioned on a/the support surface on which the part is positioned.

B1. A system for applying a surface covering to a part, comprising:
an applicator device according to any of paragraphs A1-A23;
the part; and
the surface covering.

B1.1. The system of paragraph B1, further comprising a support surface, wherein the part is positioned on the support surface.

B2. The system of paragraph B1, wherein the surface covering comprises a decorative laminate.

B3. The system of any of paragraphs B1-B2, wherein the part comprises at least one of a metallic panel and a composite panel.

B3.1. The system of any of paragraphs B1-B3, wherein the part comprises a honeycomb core panel.

B4. The system of any of paragraphs B1-B3.1, wherein the part comprises a galley panel for an aircraft.

B4.1. The system of any of paragraphs B1-B4, wherein the part comprises a wing.

B4.2. The system of any of paragraphs B1-B4.1, wherein the part comprises an aircraft fuselage.

B4.3. The system of any of paragraphs B1-B4.2, wherein the part comprises an aircraft.

B5. The system of any of paragraphs B1-B4.3, further comprising a fluid supply coupled to the inflatable bladder and configured to supply fluid to the cavity of the inflatable bladder, thereby at least partially inflating the inflatable bladder.

B6. The system of any of paragraphs B1-B5, wherein a/the support surface comprises a table that is configured to support the part during application of the surface covering.

B7. The system of any of paragraphs B1-B6, wherein a/the support surface comprises a stabilizing mechanism that is configured to secure the part with respect to the support surface.

B8. The system of any of paragraphs B1-B7, further comprising a robotic device configured to move the applicator device with respect to a/the support surface and/or the part.

B9. The system of any of paragraphs B1-B7, further comprising a robotic device configured to move the inflatable bladder with respect to a/the support surface and/or the part.

B10. The system of any of paragraphs B1-B7, further comprising a robotic device configured to move a/the support surface and/or the part with respect to the applicator device.

B11. The system of any of paragraphs B1-B7, further comprising a robotic device configured to move the part with respect to the applicator device.

B12. The system of any of paragraphs B1-B11, wherein a/the support surface on which the part is positioned has a length and a width, wherein the applicator device is configured to travel along the length of the support surface, and wherein the inflatable bladder extends across at least 50%, at least 60%, at least 70%, at least 80%, at least 90%, and/or at least 100% of the width of the support surface.

B13. The system of any of paragraphs B1-B12, wherein the inflatable bladder is sized to be at least as long as one dimension of the part.

C1. A method for applying a surface covering to a part, the method comprising:
providing a part, wherein the part has a first surface and a second surface opposite the first surface;
positioning a portion of the surface covering between the second surface of the part and an inflatable bladder;
contacting the surface covering with the inflatable bladder; and pressing the surface covering onto the second surface of the part with the inflatable bladder.

C1.1. The method of paragraph C1, further comprising positioning the part on a support surface such that the first surface faces the support surface and the second surface faces away from the support surface.

C2. The method of paragraph C1, wherein the causing the inflatable bladder to press the surface covering onto the second surface of the part comprises moving the inflatable bladder with respect to the part and the surface covering.

C3. The method of any of paragraphs C1-C2, wherein the causing the inflatable bladder to press the surface covering onto the second surface of the part comprises moving the part and the surface covering with respect to the inflatable bladder.

C3.1. The method of any of paragraphs C1-C3, further comprising filling at least a portion of the inflatable bladder with a fluid.

C4. The method of any of paragraphs C1-C3.1, wherein the filling at least a portion of the inflatable bladder with the fluid comprises filling at least a portion of the inflatable bladder with air.

C5. The method of any of paragraphs C3.1-C4, wherein the filling at least a portion of the inflatable bladder comprises filling the inflatable bladder to a pressure of at least 5 kPa, at least 10 kPa, at least 15 kPa, at least 20 kPa, at least 25 kPa, at least 30 kPa, at least 35 kPa, at least 40 kPa, at least 45 kPa, at least 50 kPa, at least 55 kPa, at least 60 kPa, at least 65 kPa, and/or at least 70 kPa.

C6. The method of any of paragraphs C1-05, wherein the surface covering comprises an outer surface, an adhesive surface, and a backing layer covering the adhesive surface, the backing layer being removable from the adhesive surface of the surface covering.

C7. The method of paragraph C6, further comprising peeling away at least a portion of the backing layer to expose at least a portion of the adhesive surface, and wherein the positioning a portion of the surface covering between the second surface of the part and an inflatable bladder comprises positioning the surface covering such that the adhesive surface of the surface covering faces the second surface of the part and the outer surface of the surface covering faces the inflatable bladder.

C8. The method of paragraph C7, wherein the peeling away at least a portion of the backing layer is performed before the positioning a portion of the surface covering between the second surface of the part and an inflatable bladder.

C9. The method of any of paragraphs C1-C8, wherein the surface covering comprises a decorative laminate.

C10. The method of any of paragraphs C1-C9, further comprising positioning a support structure coupled to the inflatable bladder, wherein the positioning the support structure comprises positioning the support structure relative to a/the support surface on which the part is positioned such that the inflatable bladder is held at a predetermined distance from the support surface.

C10.1. The method of any of paragraphs C1-C9, further comprising positioning a support structure coupled to the inflatable bladder, wherein the positioning the support structure comprises positioning the support structure relative to the part such that the inflatable bladder is held at a predetermined distance from the part.

C11. The method of any of paragraphs C1-C10.1, further comprising positioning a support structure coupled to the inflatable bladder, wherein the positioning the support structure comprises positioning the support structure relative to a/the support surface on which the part is positioned such that the inflatable bladder is held at a predetermined height above the support surface.

C11.1. The method of any of paragraphs C1-C10.1, further comprising positioning a support structure coupled to the inflatable bladder, wherein the positioning the support structure comprises positioning the support structure relative to the part such that the inflatable bladder is held at a predetermined height above the part.

C12. The method of any of paragraphs C1-C11.1, wherein the part is a composite panel.

C13. The method of any of paragraphs C1-C12, wherein the part is a honeycomb core panel.

C14. The method of any of paragraphs C1-C12, wherein the part is a wing.

C15. The method of any of paragraphs C1-C12, wherein the part is an aircraft fuselage.

C16. The method of any of paragraphs C1-C12, wherein the part is an aircraft.

D1. A part made using one or more of the applicator device of any of paragraphs A1-A23, the system of any of paragraphs B1-1313, and the method of any of paragraphs C1-C16.

E1. An aircraft containing the part of paragraph D1.

F1. Use of the device of any of paragraphs A1-A23 to apply a surface covering to a part.

G1. Use of the system of any of paragraphs B1-1313 to apply a surface covering to a part.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An applicator device for applying a surface covering to a part, comprising:
    an inflatable bladder having an external bladder surface and an internal bladder surface, the internal bladder surface defining a cavity at least partially filled with a fluid, wherein a first surface area of the surface covering is larger than a second surface area of the external bladder surface;
    a support structure that positions the inflatable bladder with respect to the part; and
    a cover material at least partially covering the external bladder surface, the cover material contacting the surface covering as it is applied to the part, wherein the cover material is configured to reduce friction between the inflatable bladder and the surface covering, and wherein the cover material is flexible enough to conform to the external bladder surface.

2. The applicator device according to claim 1, wherein the fluid comprises a gas.

3. The applicator device according to claim 1, wherein the cover material comprises one or more of felt and fiberglass.

4. The applicator device according to claim 1, wherein the support structure is configured to selectively move the inflatable bladder with respect to a support surface and the surface covering, wherein the support surface is configured to support the part while the surface covering is being applied, and wherein the inflatable bladder is configured to move in a plane that is parallel to the support surface.

5. The applicator device according to claim 1, wherein the support structure selectively moves a support surface with respect to the inflatable bladder, wherein the part is positioned on the support surface.

6. The applicator device according to claim 1, further comprising a regulator configured to maintain a desired fluid pressure within the cavity of the inflatable bladder while the surface covering is applied to the part.

7. The applicator device according to claim 1, wherein the support structure comprises one or more linear bearings.

8. The applicator device according to claim 1, wherein the support structure comprises a bladder-supporting portion that is configured to travel along one or more rails.

9. The applicator device according to claim 8, further comprising the one or more rails, wherein the one or more rails are positioned on a support surface on which the part is positioned.

10. A system for applying a surface covering to a part, the system comprising:
    an applicator device, comprising:
        an inflatable bladder having an external bladder surface and an internal bladder surface, the internal bladder surface defining a cavity at least partially filled with a fluid;
        a support structure that positions the inflatable bladder with respect to the part; and
        a cover material at least partially covering the external bladder surface, the cover material contacting the surface covering as it is applied to the part, wherein the cover material is configured to reduce friction between the inflatable bladder and the surface covering, and wherein the cover material is flexible enough to conform to the external bladder surface;
    the part; and
    the surface covering.

11. The system according to claim 10, wherein the part comprises at least one of a metallic panel and a composite panel, and wherein the surface covering comprises a decorative laminate.

12. The system according to claim 10, wherein the part comprises a galley panel for an aircraft.

13. The system according to claim 10, further comprising a fluid supply coupled to the inflatable bladder and configured to supply fluid to the cavity of the inflatable bladder, thereby at least partially inflating the inflatable bladder.

14. The system according to claim 10, further comprising a robotic device configured to move the applicator device with respect to the part.

15. A method for applying a surface covering to a part, the method comprising:
    providing the part, wherein the part has a first surface and a second surface opposite the first surface;
    positioning a portion of the surface covering between the second surface of the part and an inflatable bladder having an external bladder surface and an internal bladder surface, the internal bladder surface defining a cavity at least partially filled with a fluid, the inflatable bladder further having a cover material at least partially covering the external bladder surface, wherein the cover material is configured to reduce friction between the inflatable bladder and the surface covering, and wherein the cover material is flexible enough to conform to the external bladder surface;
    contacting the surface covering with the cover material of the inflatable bladder while the inflatable bladder is inflated to a desired fluid pressure;
    positioning a support structure coupled to the inflatable bladder, wherein the positioning the support structure comprises positioning the support structure relative to the part such that the inflatable bladder contacts the surface covering;
    pressing the surface covering onto the second surface of the part with the inflatable bladder; and
    maintaining the inflatable bladder at a fixed distance from the second surface of the part during the pressing the surface covering onto the second surface of the part.

16. The method according to claim 15, wherein the pressing the surface covering onto the second surface of the part with the inflatable bladder comprises moving the inflatable bladder with respect to and substantially parallel to the part and the surface covering.

17. The method according to claim 15, wherein the pressing the surface covering onto the second surface of the part with the inflatable bladder comprises moving the part and the surface covering with respect to the inflatable bladder.

18. The method according to claim 15, further comprising:
    filling at least a portion of the inflatable bladder with a fluid; and
    changing the fluid pressure within the inflatable bladder to a different desired fluid pressure.

19. The method according to claim 15, wherein the surface covering comprises an outer surface, an adhesive surface, and a backing layer covering the adhesive surface, the backing layer being removable from the adhesive surface of the surface covering, the method further comprising:
    peeling away a portion of the backing layer to expose a portion of the adhesive surface prior to initiating the pressing the surface covering onto the second surface of the part; and
    further peeling the backing layer away from the adhesive surface as the surface covering is applied to the part, wherein the positioning a portion of the surface covering between the second surface of the part and the inflatable bladder comprises positioning the surface covering such that the adhesive surface of the surface covering faces the second surface of the part and the outer surface of the surface covering faces the inflatable bladder.

20. The method according to claim 15, wherein the providing the part comprises providing a galley panel for an aircraft, and wherein the pressing the surface covering onto the second surface of the part comprises pressing an adhesive laminate onto the galley panel.

* * * * *